Patented Dec. 14, 1926.

1,610,946

UNITED STATES PATENT OFFICE.

EMMET F. HITCH, OF WILMINGTON, DELAWARE, AND FRANCIS H. SMITH, OF WOODSTOWN, NEW JERSEY, ASSIGNORS TO E. I. DU PONT DE NEMOURS & COMPANY, OF WILMINGTON, DELAWARE, A CORPORATION OF DELAWARE.

POLYAZO DYES AND PROCESS OF MAKING SAME.

No Drawing.   Application filed October 10, 1923.   Serial No. 667,619.

This invention relates to polyazo dyes, and especially trisazo dyes, whose molecules comprise a middle component directly connected by azo couplings with two diphenyl nuclei one of which is attached to a third azo-group.

We have discovered that new and valuable azo dyes can be prepared by combining two molecular equivalents of benzidine with one molecular equivalent of H-acid, then combining to this intermediate product one molecular equivalent of an amine or phenol and converting the remaining relatively unstable inorganic diazonium group, by suitable means, into a stable inorganic group.

To illustrate how these new dyes are prepared the following examples are given:

*Example I.*—Three hundred sixty-eight pounds of benzidine are tetrazotized in the usual manner at 5–10° C. in 7000 pounds of water using 276 pounds of sodium nitrite and 900 pounds of hydrochloric acid (sp. gr. 1.18). A solution of H-acid is prepared by suspending 341 pounds of H-acid (monosodium salt) in 3000 pounds of water and adding 37 pounds of caustic soda. This H-acid solution is added over a period of one hour to the tetrazo benzidine solution and stirred until there is no longer any test for the presence of free H-acid. When this point is reached, a solution containing 360 pounds of soda ash is added and stirring continued at 10–12° C. until there is no longer any test for free tetrazo benzidine. Two hundred thirty-nine pounds of gamma acid (2-amino-8-naphthol-6-sulphonic acid) is suspended in 1500 pounds of water and 40 pounds of caustic soda added. This solution is added immediately to the combination of benzidine and H-acid. One hundred six pounds of soda ash is added and the charge is stirred until there is no longer any test for the presence of free gamma acid. A solution of 110 pounds of sodium bisulphite in 1000 pounds of water is then added and the mixture heated to 50° C., the dye salted out with common salt, filtered, dried, and pulverized.

The process of the above example may be explained graphically by the following picture of the series of reactions which probably occur:—

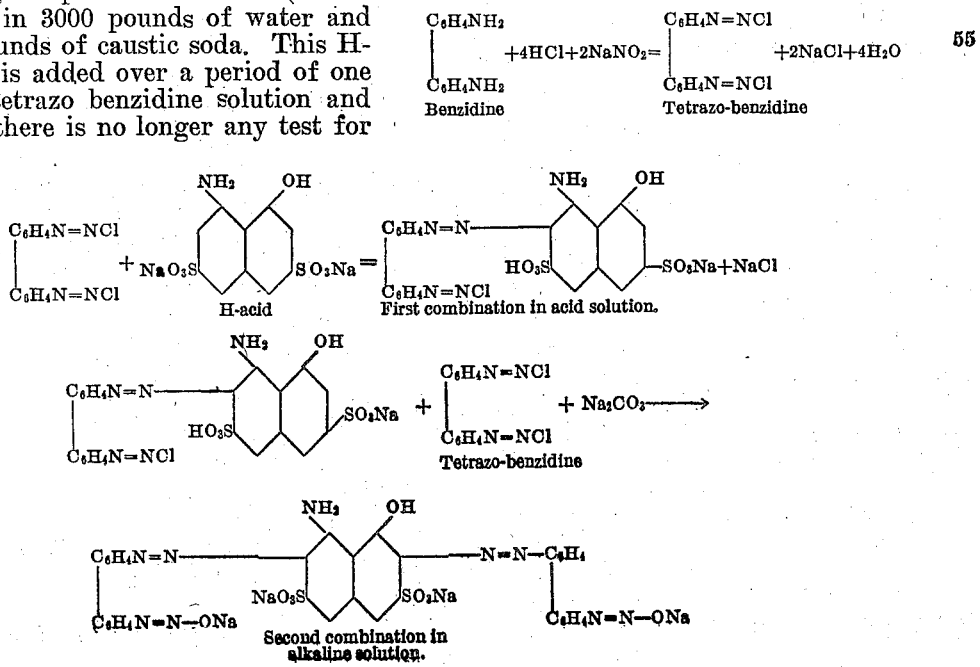

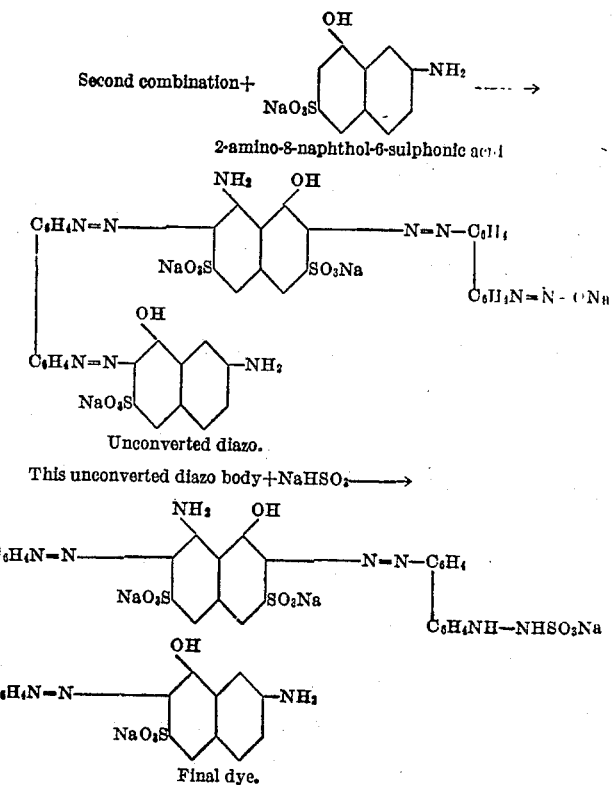

The new dye as its sodium salt is a dark powder which is soluble in water with a dark blue black coloration and in concentrated sulphuric acid with a dark greenish blue coloration. On dilution with water a reddish blue precipitate is formed. Upon reduction with stannous chloride and hydrochloric acid it is split up into 4:4′-diamino-diphenyl, 1:2:7-triamino-8-naphthol-3:6-disulphonic acid, and 2:7-diamino-8-naphthol-6-sulphonic acid. It dyes cotton fibre directly a blue black which on diazotization and development with meta-toluylenediamine gives greenish black shades very fast to washing.

*Example II.*—Prepare the intermediate combination of two molecular equivalents of benzidine on one molecular equivalent of H-acid as described in Example I. Add to this combination a solution of 138 pounds of salicylic acid in 1000 pounds of water containing 40 pounds of caustic soda. One hundred six pounds of soda ash is then added and the charge stirred until there is no longer any test for the presence of free salicylic acid. The charge is then made acid by adding 500 pounds of hydrochloric acid (sp. gr. 1.18) and heated to boiling. After cooling to 50° C., the dye is salted out with common salt, filtered, dried, and pulverized.

The dye formed probably has the following graphic formula:

The new dye is a dark green powder which is soluble in hot water to a dark green solution and in concentrated sulphuric acid to a reddish blue solution which on dilution gives a black precipitate. Upon reduction with stannous chloride and hydrochloric acid it is split up into 4:4′-diamino-diphenyl, 4-amino-4′-hydroxydiphenyl, 1:2:7-triamino-8-naphthol-3:6-disulphonic acid, and 1-amino-4-hydroxy-benzene-5-carboxylic acid. It dyes cotton a yellowish shade of green.

*Example III.*—Prepare the intermediate combination of two molecular equivalents of benzidine on one molecular equivalent of H-acid as described in Example I. A solution of 341 pounds of H-acid (mono-sodium salt) in 2000 pounds of water containing 110 pounds of soda ash is added to this combination and stirring continued until there is no longer any test for the presence of free H-acid. A solution of 110 pounds of sodium bisulphite in 1000 pounds of water is then added and the mixture heated at 50°

C. The dye is salted out with common salt, filtered, dried, and pulverized.

The new dye as its sodium salt is a dark powder which is soluble in hot water to a dark blue solution and in concentrated sulphuric acid to a greenish blue solution which on diluting gives a reddish blue precipitate. Upon reduction with stannous chloride and hydrochloric acid it is split up into 4:4'-diamino-diphenyl, 1:2:7-triamino-8-naphthol-3:6-disulphonic acid, and 1:7-diamino-8-naphthol-3:6-disulphonic acid. It dyes cotton and silk a greenish shade of blue.

Tolidine and dianisidine may be used in place of benzidine, or one molecular equivalent of tolidine or dianisidine may replace one of the molecular equivalents of benzidine, or one molecular equivalent of tolidine and one molecular equivalent of dianisidine may replace the two molecular equivalents of benzidine named in these examples.

Other compounds may be used as end components instead of those named in the examples, such as for example:—resorcin, phenol, metaphenylenediamine, metatoluylenediamine, metaphenylenediamine-sulphonic acid, metatoluylenediamine sulphonic acid, the cresols, cresidine, o-anisidine, cresotinic acid, alpha-naphthol, beta-naphthol, alpha-naphthylamine, beta-naphthylamine, 1-naphthol-4-sulphonic acid, 1-naphthol-5-sulphonic acid, 2-naphthol-6-sulphonic acid, 2-naphthol-7-sulphonic acid, 2-naphthol-8-sulphonic acid, 1-naphthol-3:6-disulphonic acid, 1-naphthol-3:8-disulphonic acid, 2-naphthol-3:6-disulphonic acid, 2-naphthol-6:8-disulphonic acid, 1:8-dihydroxynaphthalene-3:6-disulphonic acid, 1:8-dihydroxy-naphthalene-4-sulphonic acid, 1-amino-5-naphthol-7-sulphonic acid, 1-amino-8-naphthol-4-sulphonic acid, 2-amino-5-naphthol-7-sulphonic acid, 2-phenyl-amino-5-naphthol-7-sulphonic acid, 1-amino-8-naphthol-2:4-disulphonic acid, 1-amino-8-naphthol-3:6-disulphonic acid, 1-amino-8-naphthol-4:6-disulphonic acid, 2-amino-8-naphthol-3:6-disulphonic acid, 5:5'-dihydroxy-7:7'-disulpho-2:2'-dinaphtyl carbamide, 5:5'-dihydroxy-7:7'-disulpho-2:2'-dinaphthylamine, 2-hydroxy-3-naphthoic acid, 1-p-sulpho-phenyl-5-pyrazolone-3-carboxylic acid, 1-p-sulpho-phenyl-3-methyl-5-pyrazolone, 1-chloro-sulpho-phenyl-3-methyl-5-pyrazolone, 1-naphthylamine-4-sulphonic acid, 1-naphthylamine-5-sulphonic acid, 1-naphthylamine-6-sulphonic acid, 1-naphthylamine-7-sulphonic acid, 1-naphthylamine-8-sulphonic acid, 1-phenyl-naphthylamine-8-sulphonic acid, and 1-p-tolyl-naphthylamine-8-sulphonic acid.

The following graphic formulas are given as examples of the probable structure of some of the dyes formed according to the processes of the present invention:—

A dye having meta-toluylene-diamine as end component:

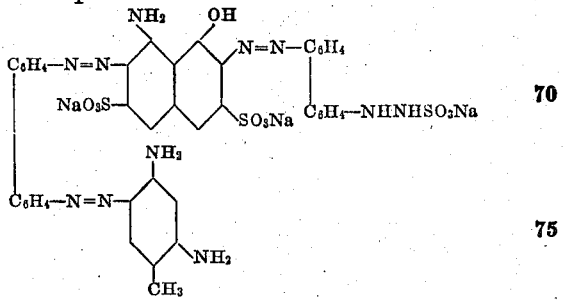

A dye having cresotinic acid as end component:

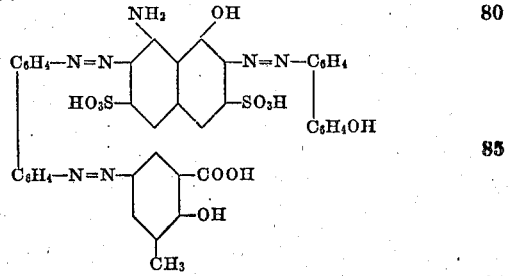

A dye having 1:8-dihydroxy naphthalene-4-sulphonic acid as end component:

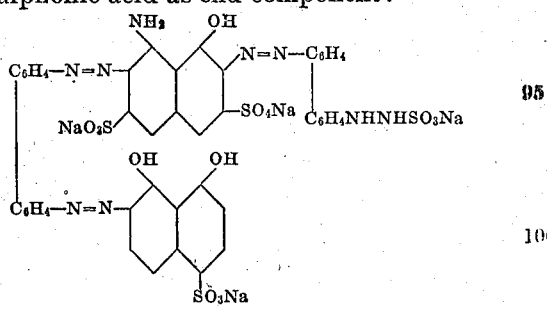

A dye having 5:5'-dihydroxy-7:7'-disulpho-2:2'-dinaphthyl carbamide as end component:

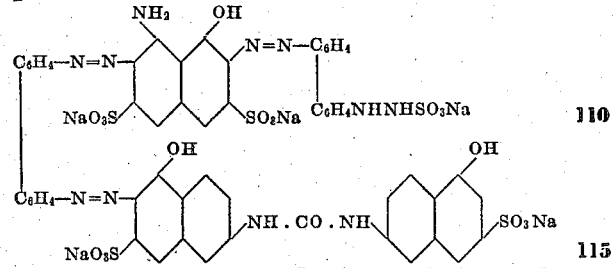

A dye having 5:5'-dihydroxy-7:7'-disulpho-2:2'-dinaphthylamine as end component:

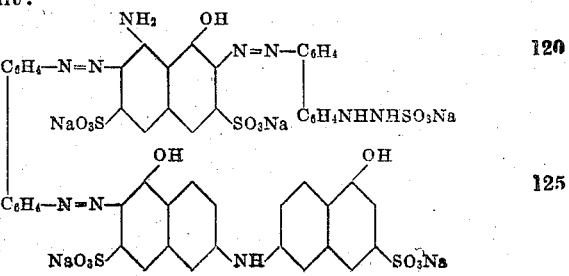

A dye having 1-p-sulpho-phenyl-3-methyl-5-pyrazolone as end component:

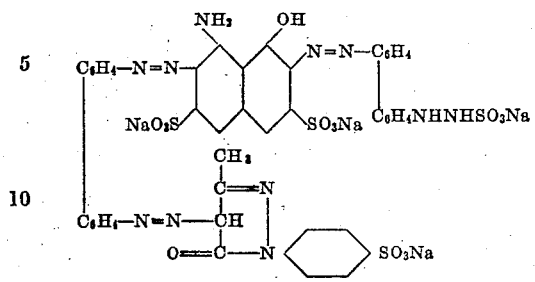

A dye having 1-phenyl naphthylamine-8-sulphonic acid as end component:

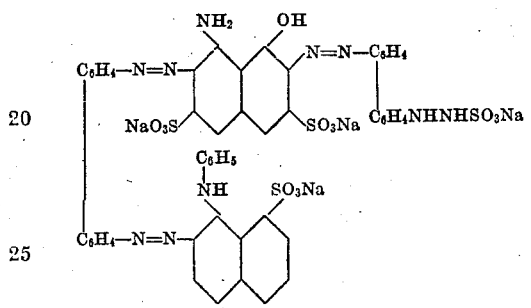

In Example II, above, the fourth, or remaining, diazonium group is converted by heating with hydrochloric acid into an hydroxyl group; while in Examples I and III, the remaining diazonium group is probably converted by heating with sodium sulphite (the sodium bisulphite being added to an alkaline solution) to a group having the formula: $NHNHSO_3Na$. The latter group, as well as the hydroxyl group, are far more stable than the diazonium group.

The structure of our new dyes may be indicated by the following graphical formula:

in which R and $R^2$ represent groups having diphenyl nuclei, R' stands for the divalent radical of 1,8-aminonaphthol-3,6-disulfonic acid, $R^3$ stands for an aromatic amine or a phenol, and X represents an inorganic group such as OH and $NHNHSO_3Na$ which is stable with respect to the conditions to which the dyestuff would ordinarily be subjected.

We claim:—

1. The process of producing polyazo dyes which comprises combining two molecular equivalents of tetrazotized benzidine with one molecular equivalent of 1,8-aminonaphthol-3,6-disulfonic acid, coupling this intermediate product with one molecular equivalent of an end component, and converting the remaining diazo group into a stable inorganic group.

2. The process of producing polyazo dyes which comprises combining two molecular equivalents of a tetrazo compound containing a diphenyl nucleus with one molecular equivalent of 1,8-aminonaphthol-3,6-disulfonic acid, coupling this intermediate product with one molecular equivalent of an aromatic compound of a class which includes amines and phenols, and converting the remaining diazo group into a stable inorganic group.

3. A process as defined in claim 1 in which the remaining diazo group is converted into a hydrazine sulphonic acid group containing most probably the following atomic structure: $NHNHSO_3$.

4. A process as defined in claim 2 in which the remaining diazo group is converted into a stable group by heating in an alkaline solution to which sodium bisulphite has been added.

5. A polyazo dye having most probably the following formula:

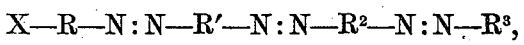

where X represents a stable inorganic group, R and $R^2$ represent radicals of compounds having diphenyl nuclei, R' stands for the divalent radical of 1,8-aminonaphthol-3,6-disulphonic acid, and $R^3$ stands for an aromatic end component.

6. A trisazo dye, obtainable by coupling two molecular equivalents of tetrazotized benzidine with one molecular equivalent of the mono-sodium salt of 1,8-aminonaphthol-3,6-disulphonic acid, coupling the resulting intermediate with one molecular equivalent of a phenol, and converting the remaining diazo group into a more stable inorganic group, said dye yielding upon reduction with stannous chloride and hydrochloric acid 4,4'-diamino-diphenyl, 1,2,7-triamino-8-naphthol-3,6-disulphonic acid, the amino derivative of said phenol, and a diphenyl compound having an amino group in 4-position, and a stable inorganic group, other than an amino group, in 4'-position.

7. A polyazo dye having most probably the following formula:

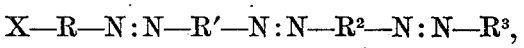

where X represents a stable inorganic group, R and $R^2$ represent diphenyl radicals, R' stands for the divalent radical of 1,8-aminonaphthol-3,6-disulphonic acid, and $R^3$ stands for an aromatic end component.

8. A polyazo dye having most probably the following formula:

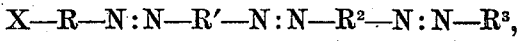

where X represents a stable inorganic group, R and $R^2$ represent radicals of compounds having diphenyl nuclei, R' stands for the divalent radical of 1,8-aminonaphthol-3,6-disulphonic acid, and $R^3$ stands for a phenol radical.

9. A polyazo dye having most probably the following formula:

$$X-R-N:N-R'-N:N-R^2-N:N-R^3,$$

where X represents a stable inorganic group, R and $R^2$ represent radicals of compounds having diphenyl nuclei, R' stands for the divalent radical of 1,8-aminonaphthol-3,6-disulphonic acid, and $R^3$ stands for a naphthol radical.

In testimony whereof we affix our signatures.

EMMET F. HITCH.
FRANCIS H. SMITH.